(12) United States Patent
Chen

(10) Patent No.: US 10,512,364 B2
(45) Date of Patent: Dec. 24, 2019

(54) GRINDER FOR PREPARING BREWING MATERIALS

(71) Applicant: CHOUKI international company LTD., Taipei (TW)

(72) Inventor: Kun-Chih Chen, Taipei (TW)

(73) Assignee: CHOUKI INTERNATIONAL COMPANY LTD., Taipei (TW)

( * ) Notice: Subject to any disclaimer, the term of this patent is extended or adjusted under 35 U.S.C. 154(b) by 869 days.

(21) Appl. No.: 15/099,042

(22) Filed: Apr. 14, 2016

(65) Prior Publication Data

US 2017/0231419 A1 Aug. 17, 2017

(30) Foreign Application Priority Data

Feb. 17, 2016 (TW) .............................. 105202244 U

(51) Int. Cl.
| | |
|---|---|
| *A47J 42/00* | (2006.01) |
| *A47J 31/42* | (2006.01) |
| *A47J 42/02* | (2006.01) |
| *A47J 42/32* | (2006.01) |
| *A47J 42/50* | (2006.01) |
| *A23F 3/06* | (2006.01) |
| *A47J 31/40* | (2006.01) |
| *B02C 25/00* | (2006.01) |

(52) U.S. Cl.
CPC .................. *A47J 42/00* (2013.01); *A23F 3/06* (2013.01); *A47J 31/404* (2013.01); *A47J 31/42* (2013.01); *A47J 42/02* (2013.01); *A47J 42/32* (2013.01); *A47J 42/50* (2013.01); *B02C 25/00* (2013.01)

(58) Field of Classification Search
CPC .. A47J 42/00; A47J 31/42; A47J 42/50; A47J 42/32; A47J 42/02; A47J 42/40; A47J 31/404; A23F 3/06; B02C 25/00
See application file for complete search history.

(56) References Cited

U.S. PATENT DOCUMENTS

| | | | | | |
|---|---|---|---|---|---|
| 3,244,327 | A | * | 4/1966 | Dunning ................ | A47G 19/34 222/369 |
| 5,267,507 | A | * | 12/1993 | Enomoto ................ | A47J 31/42 241/101.2 |
| 5,386,944 | A | * | 2/1995 | Knepler .................. | A47J 42/38 241/6 |

(Continued)

*Primary Examiner* — Jonathan G Riley
(74) *Attorney, Agent, or Firm* — Birch, Stewart, Kolasch & Birch, LLP

(57) ABSTRACT

A grinder for preparing brewing materials has a main casing, a grinding assembly and an unloading assembly to measure the amount of the brewing powder to unload. The unloading assembly has an unloading motor and a measuring barrel. When the user puts the brewing materials into the main casing, the grinding assembly grinds the brewing materials into the brewing powder. The brewing powder drops into the unloading assembly. When the unloading motor actuates the measuring barrel rotates, the brewing powder is deposited in a partafilter. Therefore, a user can grind tea leaves, Chinese herbal medicine, the petals and so on to have fresh brewing powder. Brewing liquids with the fresh brewing powder keeps the nutrient content and flavor. In addition, the bags for packaging the brewing powder is no longer needed to reduce environmental pollution and packaging cost.

15 Claims, 16 Drawing Sheets

(56) References Cited

U.S. PATENT DOCUMENTS

| | | | | |
|---|---|---|---|---|
| 5,511,465 | A * | 4/1996 | Friedrich | A47J 31/42 99/286 |
| 5,603,458 | A * | 2/1997 | Sandolo | A47F 1/02 241/100 |
| 5,660,336 | A * | 8/1997 | Joseph, Jr. | A47J 31/42 241/27 |
| 5,718,163 | A * | 2/1998 | Termini | A47J 42/00 241/34 |
| 6,095,032 | A * | 8/2000 | Barnett | A47J 31/404 100/145 |
| 6,349,889 | B1 * | 2/2002 | Sandolo | A47F 1/035 241/100 |
| 7,264,186 | B2 * | 9/2007 | Lassota | A47J 31/42 241/100 |
| 7,673,555 | B2 * | 3/2010 | Nosler | A47J 31/007 426/433 |
| 7,703,639 | B2 * | 4/2010 | Landau | A47G 19/34 222/1 |
| 9,510,710 | B1 * | 12/2016 | Kaminski | A47J 42/44 |
| 2003/0025012 | A1 * | 2/2003 | Lassota | A47J 31/42 241/34 |
| 2003/0234264 | A1 * | 12/2003 | Landau | A47G 19/34 222/368 |
| 2006/0222736 | A1 * | 10/2006 | Keller | A47J 31/42 426/45 |
| 2008/0202345 | A1 * | 8/2008 | Delonghi | A47J 31/42 99/280 |
| 2009/0095165 | A1 * | 4/2009 | Nosler | A47J 31/007 99/289 R |
| 2009/0136639 | A1 * | 5/2009 | Doglioni Majer | A47J 31/36 426/431 |
| 2011/0283889 | A1 * | 11/2011 | Con | A47J 31/42 99/286 |
| 2012/0024160 | A1 * | 2/2012 | Van Os | A47J 31/42 99/280 |
| 2013/0082130 | A1 * | 4/2013 | Hulett | A47J 31/42 241/277 |
| 2013/0302481 | A1 * | 11/2013 | Dalla Corte | A47J 31/52 426/231 |
| 2013/0327867 | A1 * | 12/2013 | Palmer | F16D 1/101 241/285.1 |
| 2014/0203118 | A1 * | 7/2014 | Rego | A47J 42/44 241/6 |
| 2016/0058241 | A1 * | 3/2016 | Tsutsumi | A47J 31/52 99/283 |

* cited by examiner

GRINDER FOR PREPARING BREWING MATERIALS

CROSS-REFERENCE TO RELATED APPLICATIONS

This application is based upon and claims priority under 35 U.S.C. 119 from Taiwan Patent Application No. 105202244 filed on Feb. 17, 2016, which is hereby specifically incorporated herein by this reference thereto.

BACKGROUND OF THE INVENTION

1. Field of the Invention

The present invention relates to a grinder, especially to a grinder for preparing brewing materials.

2. Description of the Prior Arts

Tea has multiple effects such as stimulating the mind, increasing immunity to disease, reducing cholesterol, protecting against cancer, anti-aging and so on. The tea beverage becomes one of the indispensable beverages in people's life based on the culture of tea in eastern society for thousands of years and the tradition of afternoon tea in western high society. In recent decades, Taiwan has developed the shaken-tea (also well known as "bubble tea") culture so that the tea can be hot or cold and even fruit, milk, bubbles and so on can be incorporated into the tea by the shaker or the mixer. Then the user can choose their own desired flavors for the tea so tea becomes more and more popular. In recent years, the tea beverages have been popularized all over the world by becoming a popular nonalcoholic beverage.

Shaken-tea uses liquid tea prepared in advance as a base, but the liquid tea prepared in advance has an expiration time and will spoil with time or by the ambient temperature. Since more people are enjoying tea, the varieties of liquid tea at the scene is developed (i.e. brewing the liquid tea at the store in front of the consumer using a brewing machine when the consumer orders the shaken-tea.) Thus, the shaken-tea provided to the consumer is fresher and more palatable. In the prior art, directly using tea leaves to brew tea takes longer and requires a larger container to allow the tea leaves to have enough room to scatter so that better liquid tea is obtained. Then the liquid tea brewed with tea leaves ground into a powder has a better taste and saves more nutrient content than the liquid tea that is brewed from larger tea leaves. Moreover, using powdered tea to brew the liquid tea causes the liquid tea to have the same excellent taste and quality as the liquid tea brewed in a traditional tea pot.

However, the conventional way to prepare powdered tea is to grind a mass of tea leaves into powdered tea, and the powdered tea is divided into multiple small portions. Each portion is packaged in a small bag so that human power is needed to pack the powdered tea. The small bags end up being waste when the powdered tea is brewed into liquid tea and pollutes the environment. In addition, the powdered tea absorbs moisture easier than tea leaves since the powdered tea is smaller size has a larger total surface area. Thus, temperature and humidity changes may spoil the powdered tea. Spoiled powdered tea loses nutrient content and flavor.

Although freshly ground coffee is well known in the current beverage market, conventional grinders for coffee beans are only suited for grinding coffee beans since the coffee beans have specific weights and shapes while the tea leaves are relatively light and have irregular shapes. A conventional grinder for coffee beans determines the grinding time based on the operation time of a grinding motor. If the conventional grinder for coffee beans is directly used to grind tea leaves, the grinding motor may idle when the tea leaves do not fall into the grinding area since the tea leaves are relatively light and have irregular shaped. Determining if the amount of ground powdered tea is adequate becomes harder for people doing the grinding. When the amount of ground powdered tea is incorrect, the flavor of the liquid tea is accordingly influenced.

To overcome the shortcomings, the present invention provides a grinder for preparing brewing materials to mitigate or obviate the aforementioned problems.

SUMMARY OF THE INVENTION

The main objective of the present invention is to provide a grinder for preparing brewing materials. The grinder for has a main casing to hold brewing materials, a grinding assembly to grind the brewing materials and an unloading assembly to measure the amount of powder to unload. The unloading assembly has an unloading motor and a measuring barrel. When the user puts the brewing materials into the main casing, the grinding assembly grinds the brewing materials into the brewing powder. The brewing powder drops into the unloading assembly to be collected. When the unloading motor actuates the measuring barrel rotates, the brewing powder is deposited in a partafilter. Therefore, a user can grind tea leaves, Chinese herbal medicine, petals and so on to have fresh powdered tea, herbal powder, petal powders and so on. Brewing liquids with the fresh brewing powders keeps the nutrient content and flavor. In addition, bags for packaging the brewing powder are no longer needed to reduce environmental pollution and packaging cost.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
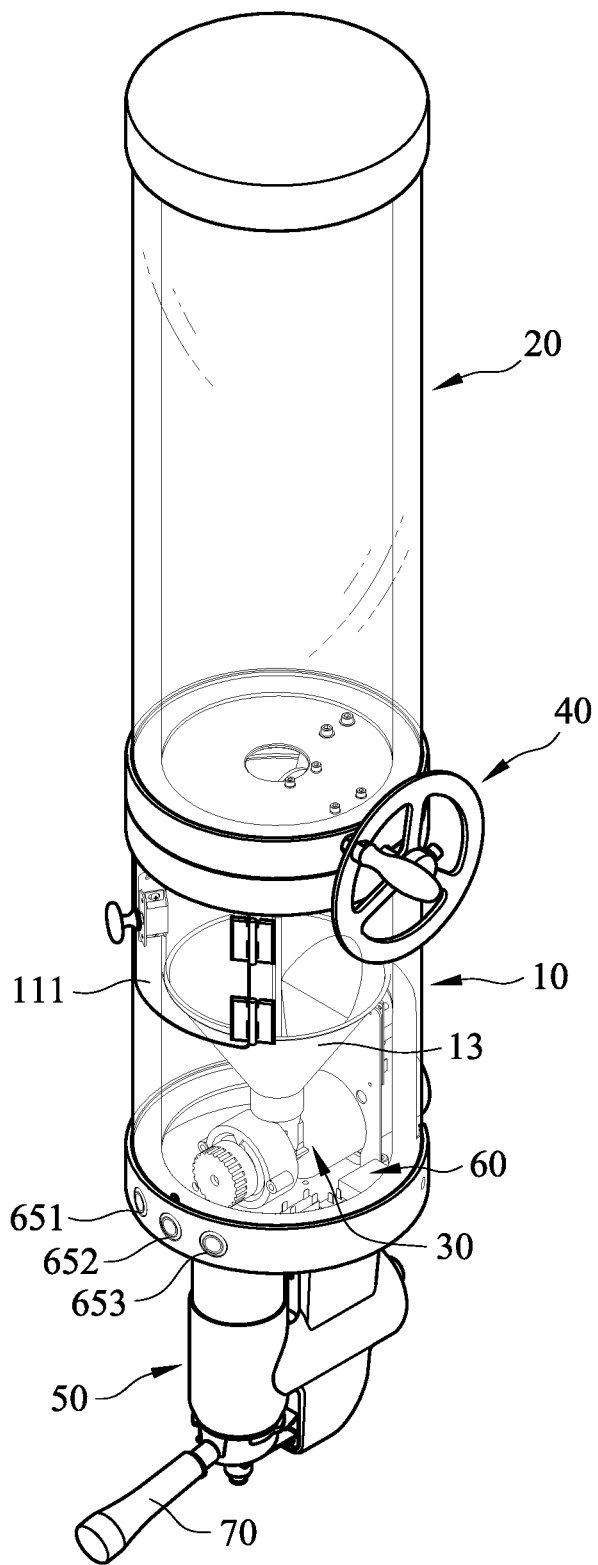
FIG. 1 is a perspective view of a grinder for preparing brewing materials in accordance with the present invention.

With reference to FIG. 1, a grinder for preparing brewing materials in accordance with the present invention comprises a main casing 10, an optional additional casing 20, a grinding assembly 30, an optional auxiliary assembly 40, an unloading assembly 50 and an optional control module 60.

Figure 2:
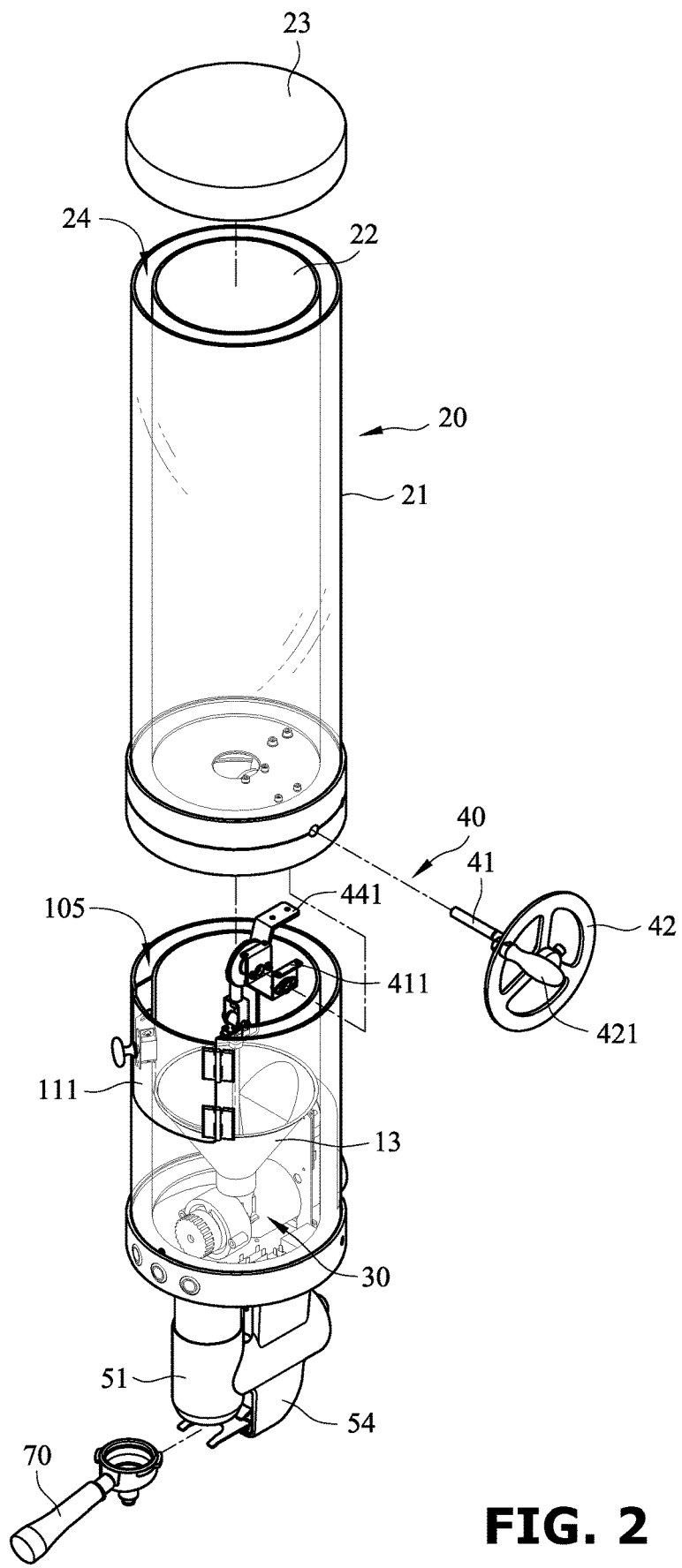
FIG. 2 is an exploded perspective view of the grinder in FIG. 1.
Figure 3:
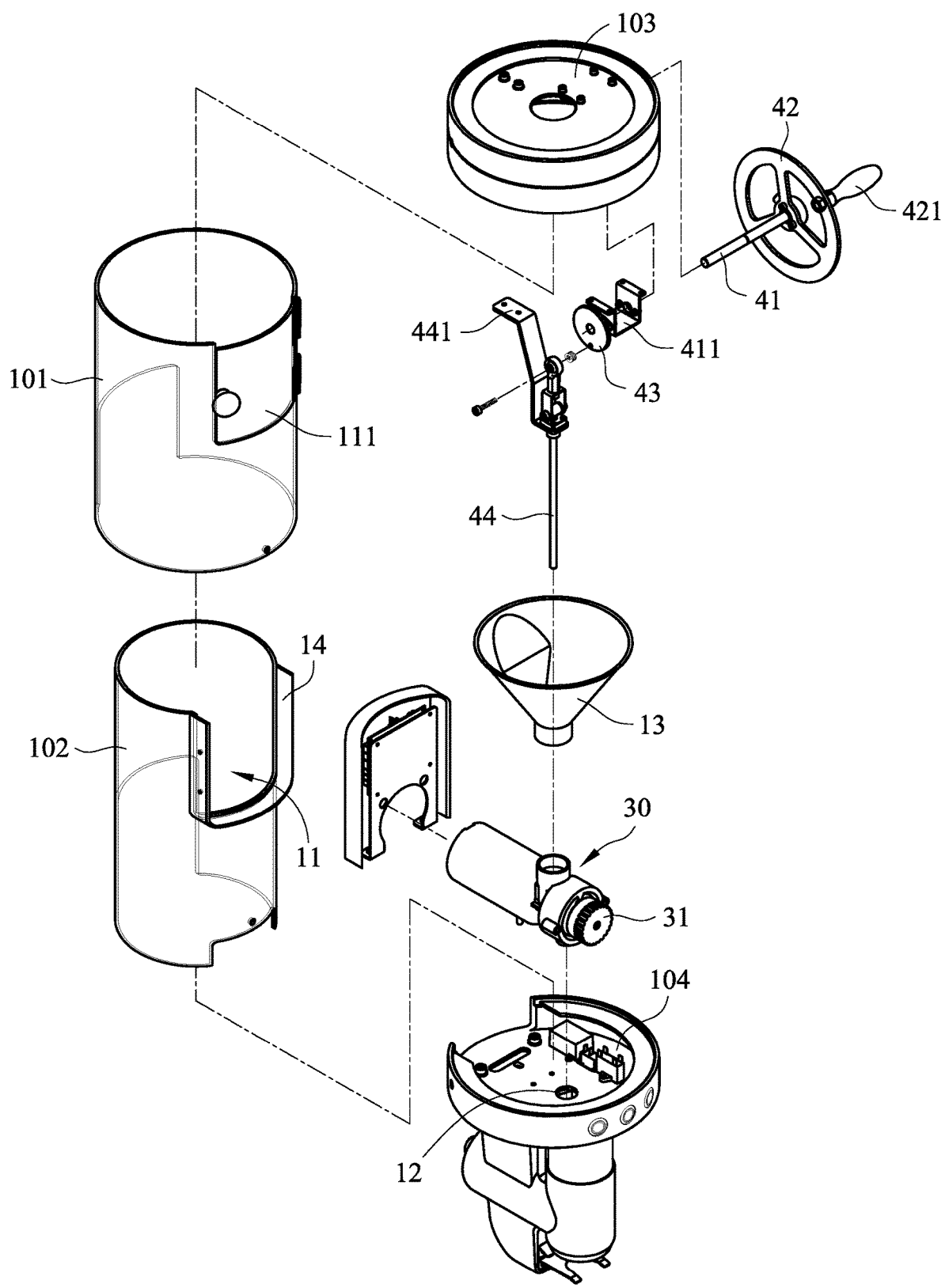
FIG. 3 is an enlarged exploded perspective view of the grinder in FIG. 1.

With reference to FIGS. 1 to 3, the main casing 10 may be cylindrical, has a diameter, a top end, a bottom end, a wall, an inlet 11, an outlet 12 and a holder 13. The inlet 11 and the outlet 12 are formed through the wall of the main casing 10, and the inlet 11 may be located higher than the outlet 12. The holder 13 is mounted between the inlet 11 and the outlet 12 and has a first end opening and a second end opening. The first end opening communicates with the inlet 11. The second end opening communicates with the outlet 12. The holder 13 may be a funnel and may be wide at the first end opening and narrow at the second end opening.

The main casing may comprise an outer casing 101, an inner casing 102, a top panel 103, a bottom panel 104, a partition 14 and a door 111. The inner casing 102 is mounted in the outer casing 101 at an interval to form a display space 105. The outer casing 101 may be transparent so that the brewing materials such as the tea leaves, the Chinese herbal medicine material, the petals, adlay and so on may be put into the display space 15 for exhibition. The top panel 103 covers top ends of the outer casing 101 and the inner casing 102. The bottom panel 104 covers the bottom ends of the outer casing 101 and the inner casing 102. The inlet 11 may be formed through the outer casing 101 and the inner casing 102. The partition 14 is formed in the display space 105 and surrounds the inlet 11 to keep the inlet 11 from communicating with the display space 105 so that the brewing materials passing through the inlet 11 do not fall into the display space 105. The door 111 is mounted pivotally on the outer casing 101 and is selectively closed to cover the inlet 11. The outlet 12 may be formed through the bottom panel 104. The holder 13 may be mounted in the inner casing 102.

The additional casing 20 may be cylindrical and has a diameter, is mounted on the top end of the main casing 10 and comprises an outer casing 21, an inner casing 22 and a top panel 23. The inner casing 22 of the additional casing 20 is mounted in the outer casing 21 of the additional casing 20 at an interval to form a display space 24. The outer casing 21 of the additional casing 20 may be transparent so that the brewing materials such as the tea leaves, the Chinese herbal medicine material, petals, adlay and so on may be put into the display space 24 of the additional casing for exhibition. The top panel 23 of the additional casing 20 covers the top ends of the outer casing 21 and the inner casing 22. Bottom ends of the outer casing 21 and the inner casing 22 of the additional casing 20 connects to the top panel 103 of the main casing 10. The diameter of the additional casing 20 may be the same as the diameter of the main casing 10 and connect to each other to form an elongated barrel-shape.

Figure 13:
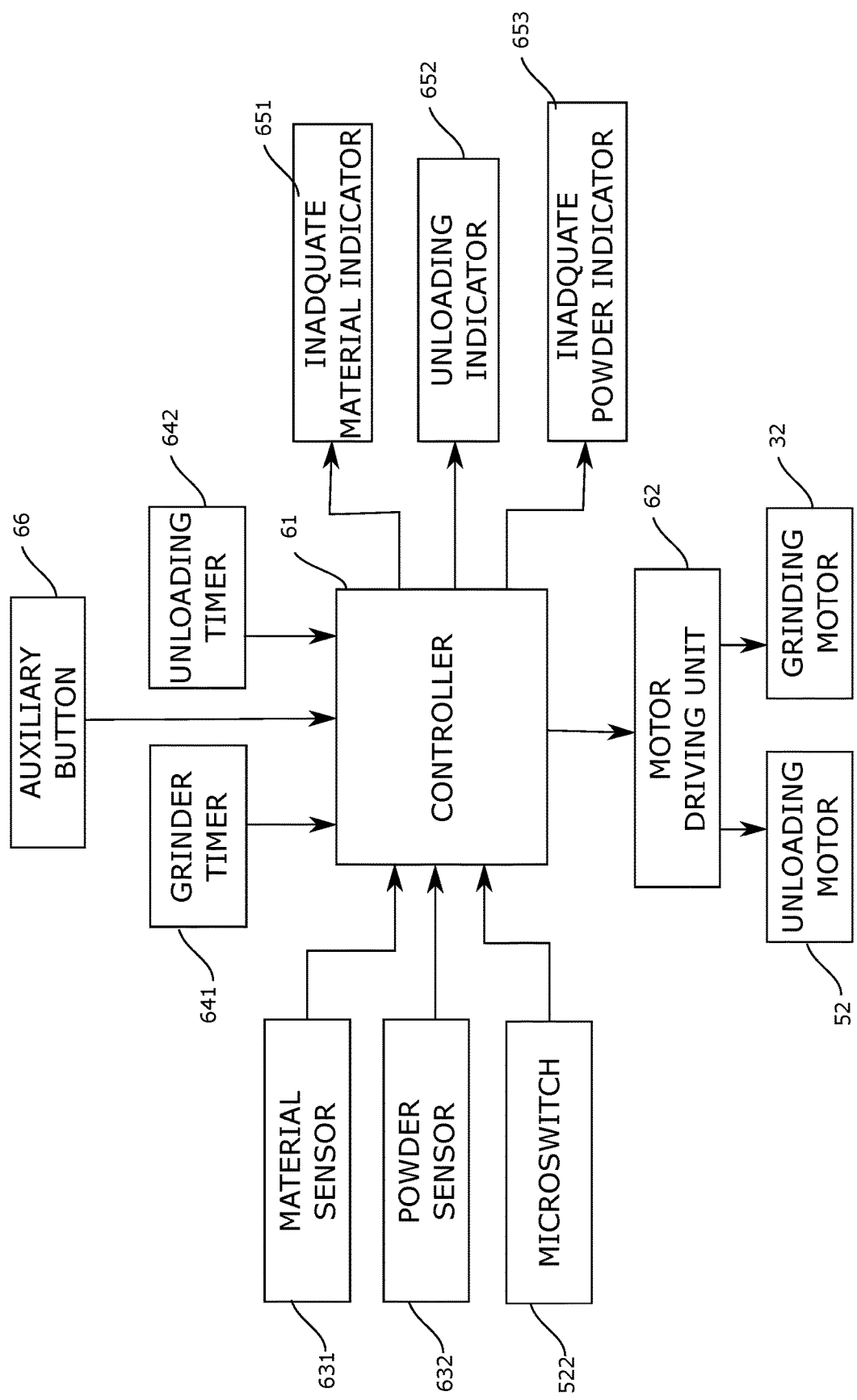
FIG. 13 is a functional block diagram of the grinder in FIG. 1.

With further reference to FIG. 13, the grinding assembly 30 is mounted in the main casing 10 and is mounted between the holder 13 and the outlet 12. The brewing materials pass through the holder 13 into the grinding assembly 30 and are ground into brewing powders by the grinding assembly 30. Then the brewing powders leave the grinding assembly 30 and pass through the outlet 12. The grinding assembly 30 has a grinding motor 32 and a blade disk. The grinding motor 32 drives the blade disk to grind the brewing materials. The grinding assembly 30 may have a knob 31 to adjust the blade disk to grind the brewing materials into brewing powders with different diameters. The detail structure of the blade disk is well known for a person having ordinary skill in the art so that is not described in detail here. The grinding motor 32 may be actuated in different ways. For example, an external button is connected electrically to actuate the grinding motor 32, the grinding motor 32 is automatically actuated when the brewing materials are detected, or the grinding motor 32 is controlled by the optional control module 60. Furthermore, the user may adjust the parameter of the grinding assembly 30 based on the features of the different brewing materials such as the operation time of the grinding motor 32, the size of the blade disk and so on.

Figure 4:
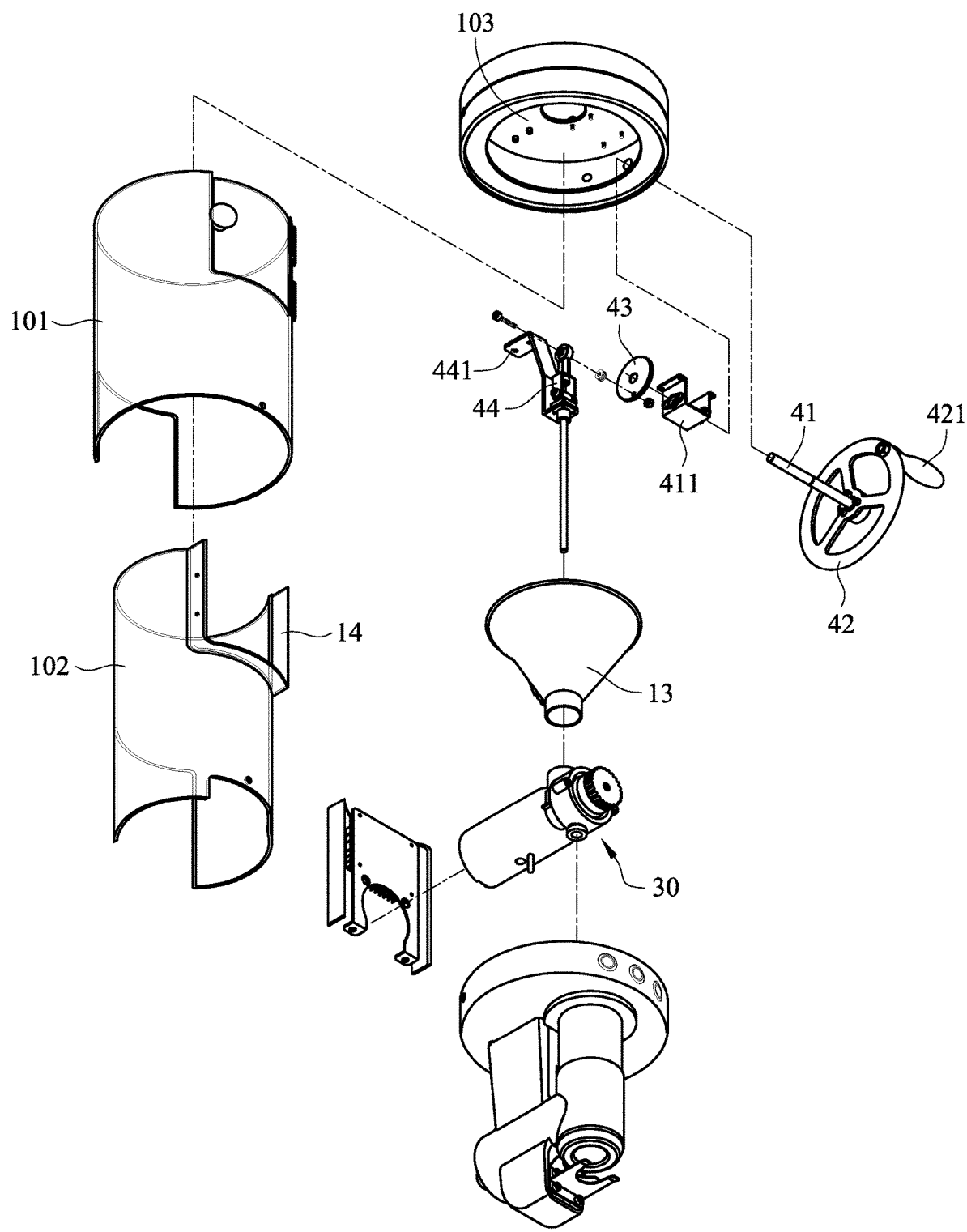
FIG. 4 is another enlarged exploded perspective view of the grinder in FIG. 1.

With reference to FIGS. 2 to 4, the auxiliary assembly 40 is mounted in the main casing 10 and comprises a shaft 41, a driving wheel 42, a driven wheel 43 and a linkage 44. The shaft 41 is mounted pivotally through the main casing 10 and has an outer end and an inner end. The outer end of the shaft 41 extends out of the main casing 10. The driving wheel 42 is mounted securely on the outer end of the shaft 41. The driven wheel 43 is mounted in the main casing 10 and is mounted securely on the inner end of the shaft 41. The linkage 44 is connected to the driven wheel 43 and has a top end and a bottom end. The top end of the linkage 44 is attached to the driven wheel 43. The bottom end of the linkage 44 extends into the holder 13.

Figure 5:
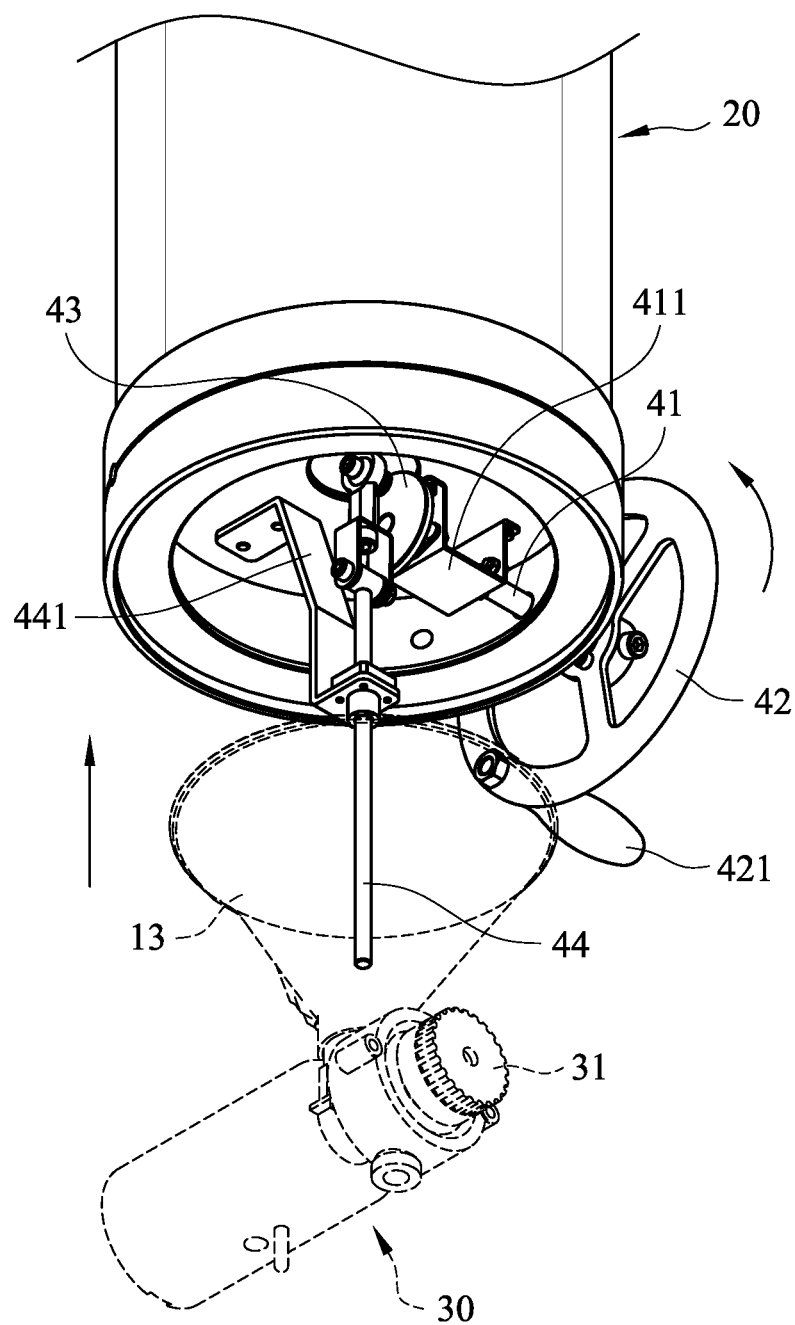
FIG. 5 is an enlarged operational perspective view of the grinder in FIG. 1, showing the operation of the auxiliary assembly.
Figure 6:
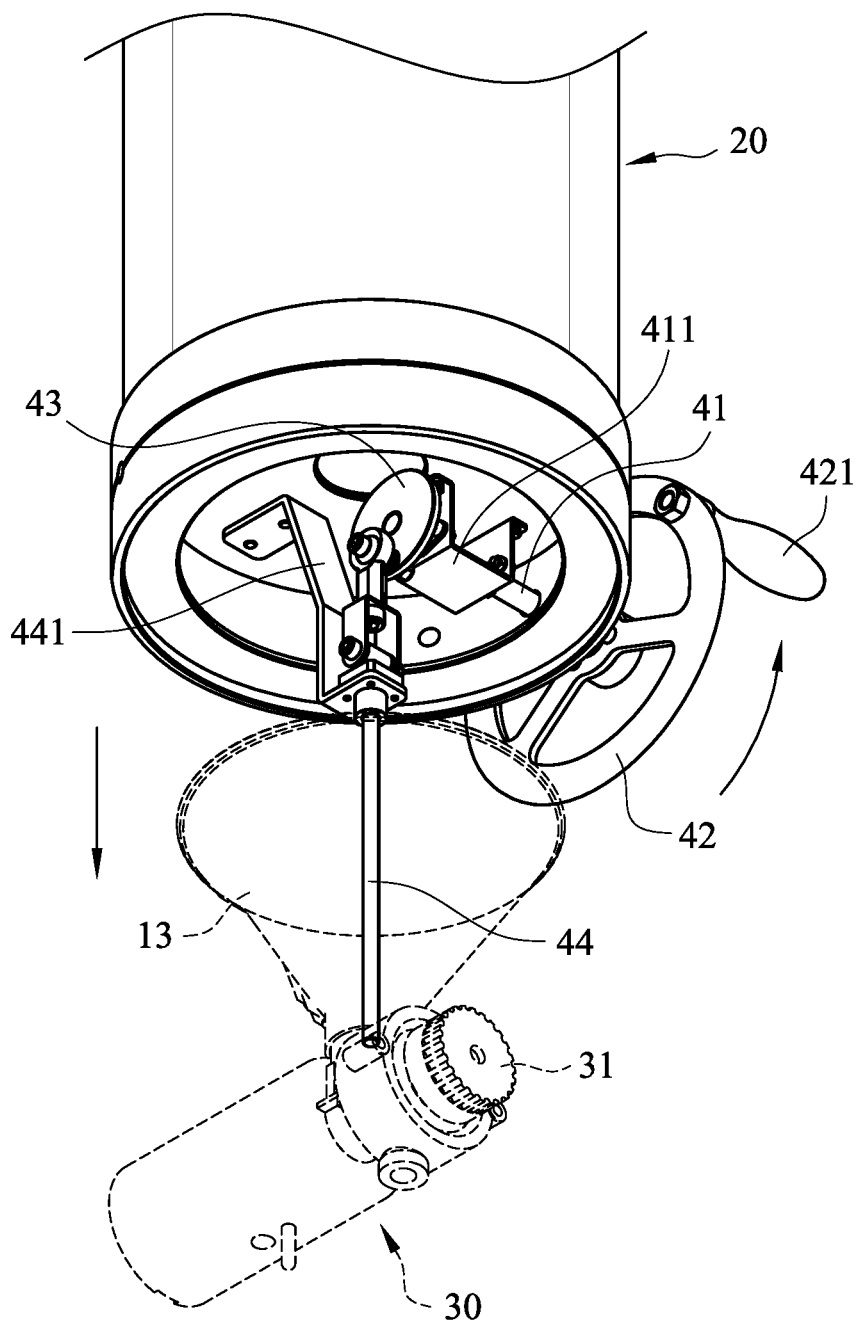
FIG. 6 is another enlarged operational perspective view of the grinder in FIG. 1, showing another operation of the auxiliary assembly.

With further reference to FIGS. 5 and 6, the shaft 41 is driven by the driving wheel 42, when the user spins the driving wheel 42. Then the driven wheel 43 is driven and is rotated. When the driven wheel 43 is rotated, the linkage 44 is moved up and down.

The auxiliary assembly 40 may comprise a first bracket 411, a second bracket 441 and a handle 421. The first bracket 411 is mounted securely in the main casing 10 and is mounted rotatably around the shaft 41 to keep the shaft 41 from tilting. The second bracket 441 is mounted securely in the main casing 10 and is mounted slidably around the linkage 44 to keep the linkage 44 from tilting. The handle 421 is formed on the driving wheel 42 to be held by the user so that the user may easily rotate the driving wheel 42.

Figure 7:
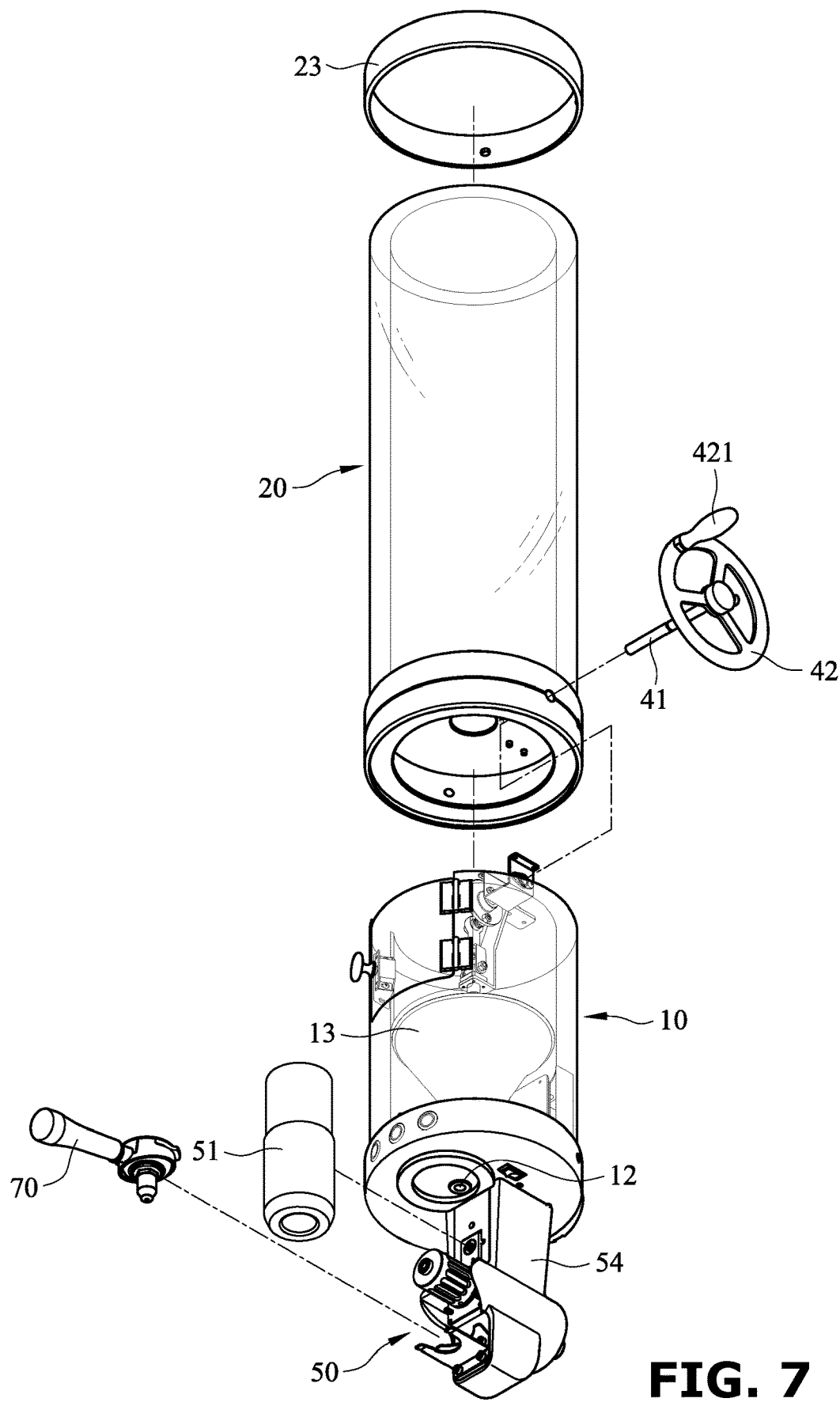
FIG. 7 is another exploded perspective view of the grinder in FIG. 1.
Figure 8:
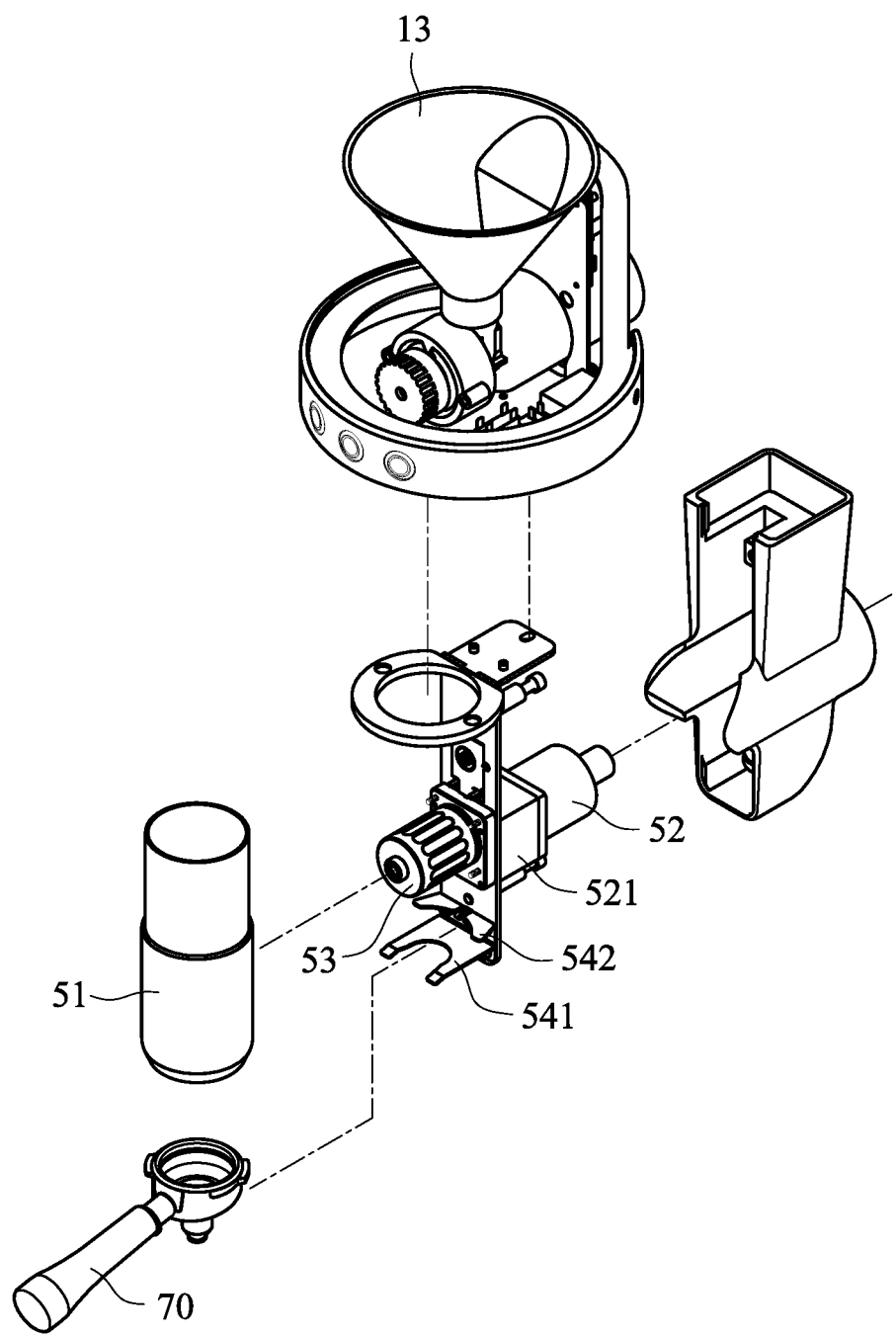
FIG. 8 is another enlarged exploded perspective view of the grinder in FIG. 1.
Figure 9:
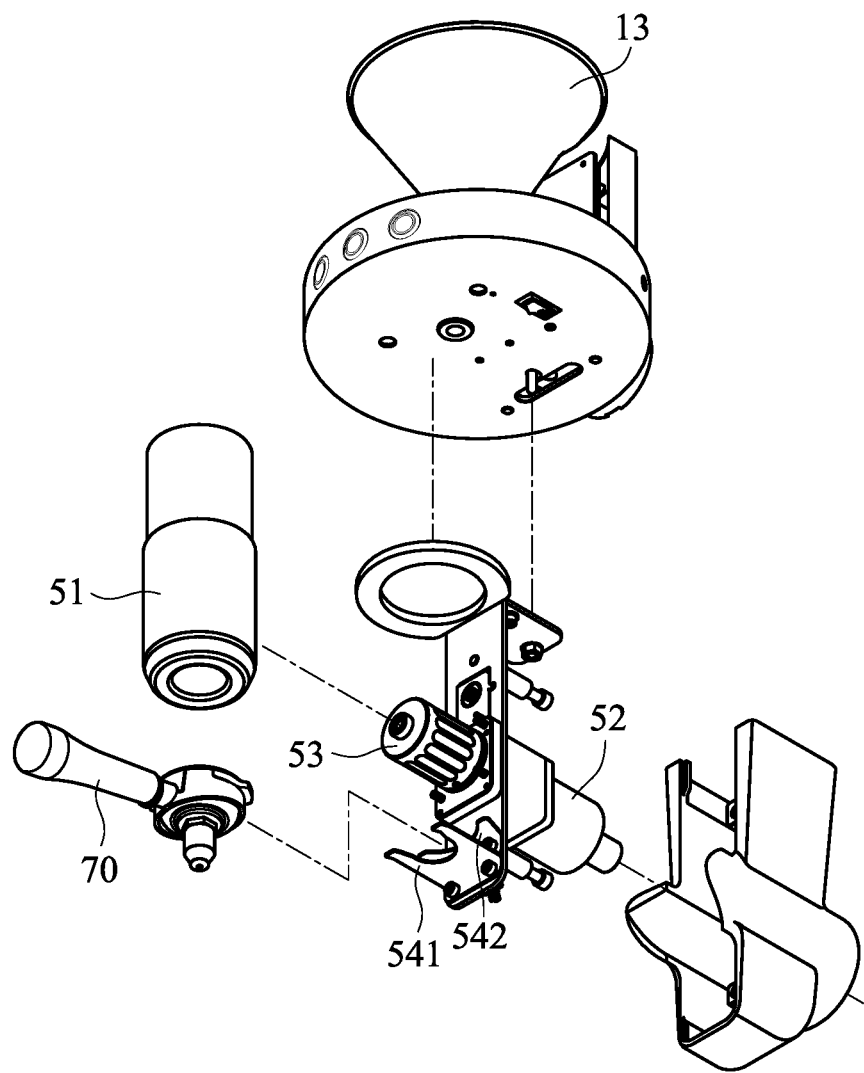
FIG. 9 is another enlarged exploded perspective view of the grinder in FIG. 1.
Figure 10:
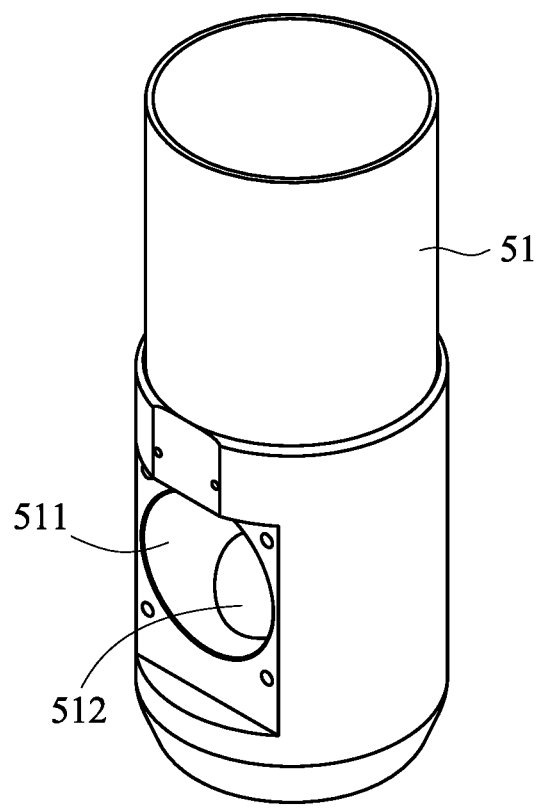
FIG. 10 is a perspective view of an intermediate barrel of the grinder in FIG. 1.
Figure 11:
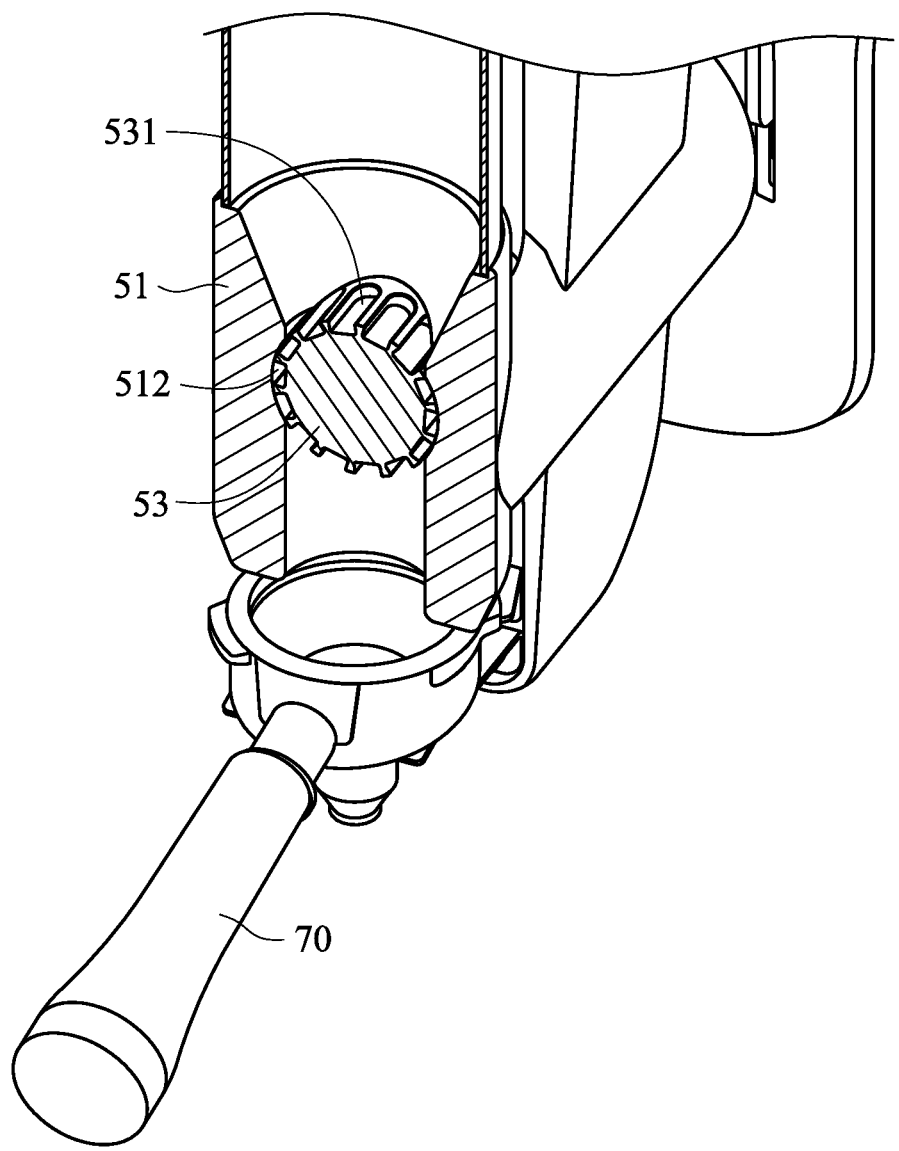
FIG. 11 is an enlarged perspective view in partial section of the intermediate barrel of the grinder in FIG. 1 with a partafilter.
Figure 12:
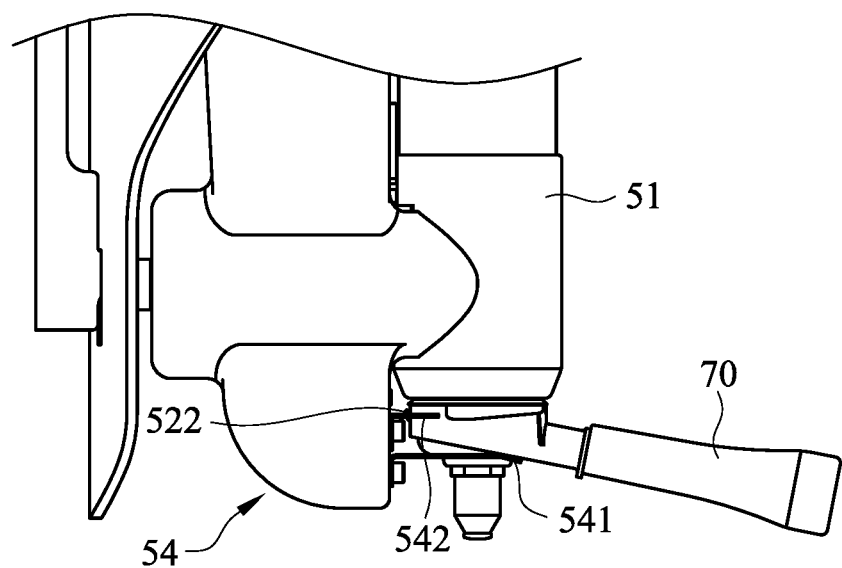
FIG. 12 is an enlarged side view of the intermediate barrel of the grinder in FIG. 1 with a partafilter.

With reference to FIGS. 7 to 9, the unloading assembly 50 is mounted under the main casing 10 and comprises an intermediate barrel 51, an unloading motor 52 and a measuring barrel 53. The intermediate barrel 51 corresponds to the outlet 12 of the main casing 10 and has a top open end and a bottom open end. The top open end of the intermediate barrel 51 communicates with the outlet 12 of the main casing 10 to receive the brewing powder. With further reference to FIGS. 10 and 11, the intermediate barrel 51 may have an axis hole 511 and a neck space 512. The axis hole 511 is formed through the intermediate barrel 51. The neck space 512 is formed in the intermediate barrel 51 and has an inner diameter smaller than the rest of the intermediate barrel 51. The unloading motor 52 is connected electrically to and rotates the measuring barrel 53. The measuring barrel 53 is cylindrical, has an outer wall, an outer diameter, has multiple slots 531, is mounted through the axis hole 511, and is mounted rotatably in the neck space 512. The outer diameter of the measuring barrel 51 corresponds to the inner diameter of the neck space 512 to allow the quantitative barrel 53 to rotate in the neck space 512 but not to move transversely. The multiple slots 531 are formed longitudinally in the outside wall of the measuring barrel 53. The unloading motor 52 may drive the measuring barrel 53 through a reduction gear assembly 521. The unloading motor 52 may be actuated in different ways. For example, an external button may be connected electrically to actuate the unloading motor 52, or the unloading motor 52 may be controlled by the optional control module 60. With further reference to FIG. 12, the unloading assembly 50 may comprise a microswitch 522. The microswitch 522 corresponds to the bottom opening of the intermediate barrel 51 to control the activation of the unloading motor 52. The unloading assembly 50 may be mounted on a seat 54. The seat 54 is mounted securely on the bottom of the main casing 10 and has a first frame 541 and two second frames 542. The first frame 541 has a notch to receive a bottom edge of a partafilter 70. The second frames 542 are arc and are mounted at an interval above the first frame 541 to receive a top edge of the partafilter 70. The microswitch 522 is mounted between the second frames 542. When the partafilter 70 is put against the first frame 541 and the second frames 542, the partafilter 70 presses against the microswitch 522 to actuate the unloading motor 52.

With reference to FIG. 13, the control module 60 is connected electrically to the grinding assembly 30 and the unloading assembly 50 to control the grinding motor 32 and the unloading motor 52. The control module 60 may comprise a controller 61, a motor driving unit 62, a material sensor 631, a powder sensor 632, a grinding timer 641, an unloading timer 642, a inadequate material indicator 651, an unloading indicator 652, a inadequate powder indicator 653 and an auxiliary button 66. The controller 61 is connected electrically to the motor driving unit 62, the material sensor 631, the powder sensor 632, the grinding timer 641, the unloading timer 642, the inadequate material indicator 651, the unloading indicator 652, the inadequate powder indicator 653, the auxiliary button 66 and the microswitch 522 to receive or transmit control signals.

Figure 14:
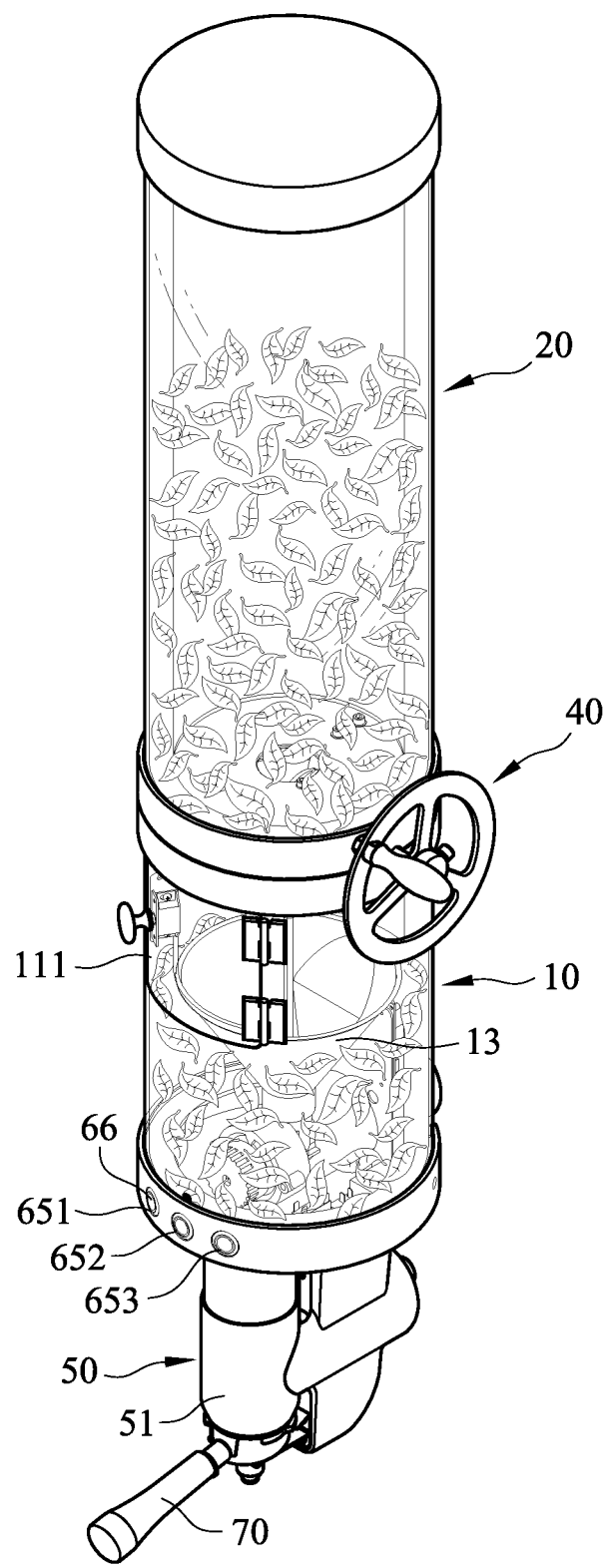
FIG. 14 is an operational perspective view of the grinder in FIG. 1, filled with tea leaves.
Figure 15:
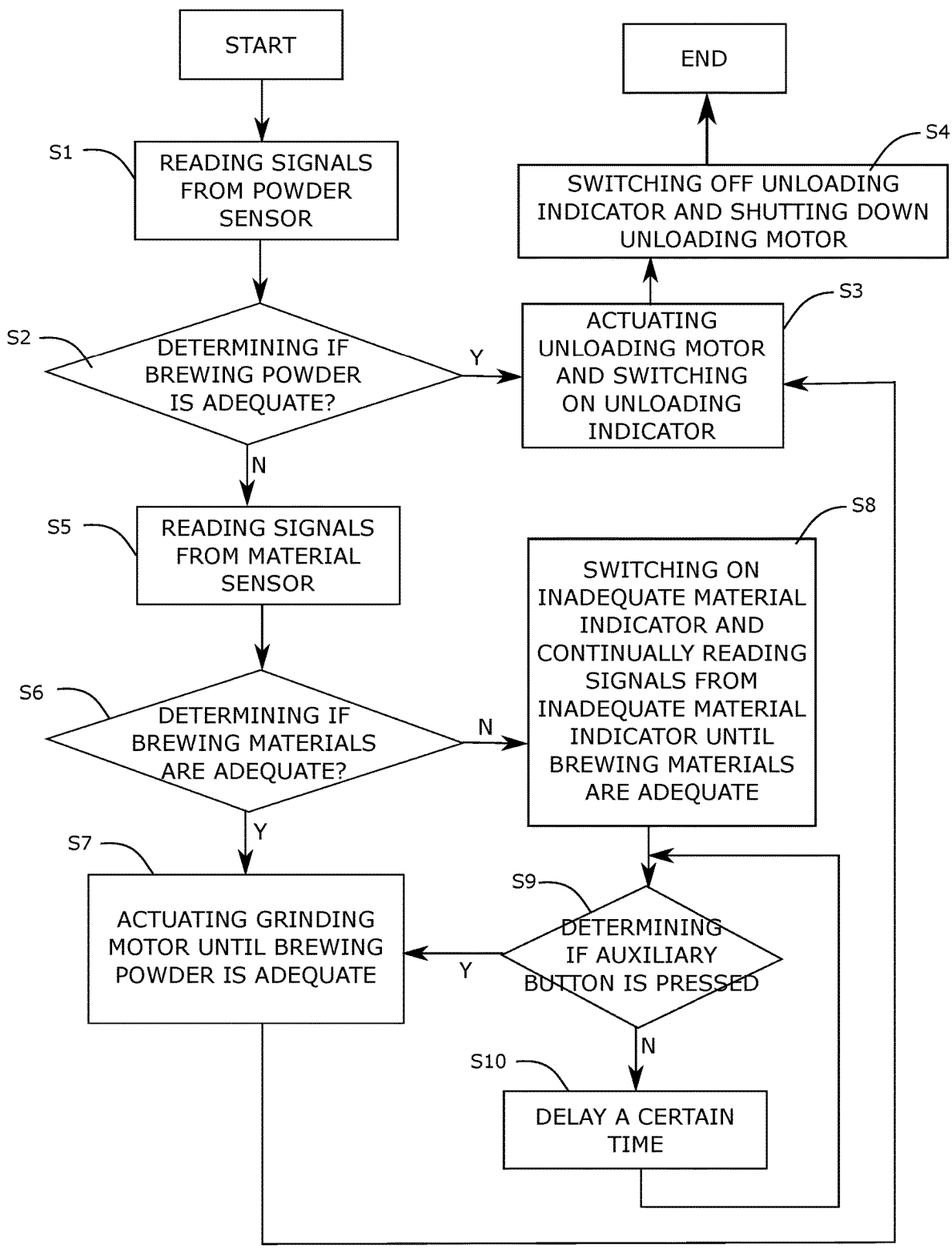
FIG. 15 is a flow chart of the process executed by a controller of the grinder in FIG. 1.

The motor driving unit 62 is connected electrically to the grinding motor 32 and the unloading motor 52 to control the grinding motor 32 and the unloading motor 52. The material sensor 631 is mounted in the main casing 10 to sense the amount of brewing materials in the holder 13. The material sensor 631 may be a position sensor to sense if the brewing materials are higher than a certain height of the holder 13 to determine if the brewing materials are adequate. The powder sensor 632 is mounted in the intermediate barrel 51 to sense the amount of brewing powders in the intermediate barrel 51. The powder sensor 632 may be a position sensor to sense if the brewing powders are at a certain level in the intermediate barrel 51 to determine if the brewing powders are adequate. With further reference to FIG. 14, the inadequate material indicator 651, the unloading indicator 652 and the inadequate powder indicator 653 are mounted on the main casing 10 to be easily watched by the user. The auxiliary button 66 may be covered with one of the indicators 651, 652, 653.

The grinder in accordance with the present invention has different operational statuses described as indicated below.

Standby status: when the brewing materials in the holder 13 are not adequate, the material sensor 631 transmits a corresponding sensing signal to the controller 61. The controller 61 lights up the inadequate material indicator 651 to let the user know the brewing materials in the holder 13 are not adequate. When that the brewing powders in the intermediate barrel 51 are not adequate, the powder sensor 632 transmits a corresponding sensing signal to the controller 61. The controller 61 switches on the inadequate powder indicator 653 to let the user know that the brewing powders in the intermediate barrel 51 are not adequate.

Unloading status: with reference to FIGS. 12 to 15, the partafilter 70 presses against the microswitch 522 when the user puts the partafilter 70 under the unloading assembly 50. Then the controller 61 executes the steps of receiving the sensing signals from the powder sensor 632 (S1), and determining if the brewing powders in the intermediate barrel 51 are adequate based on the sensing signals from the powder sensor 632 (S2).

If the brewing powders in the intermediate barrel 51 are determined to be adequate in step (S2), the controller 61 transmits a signal to the motor driving unit 62 so that the motor driving unit 62 actuates the unloading motor 52, and the unloading indicator 652 lights up simultaneously (S3) to allow the user to know that the brewing powders are dropping into the partafilter 70. With further reference to FIG. 11, the unloading motor 52 rotates the measuring barrel 53. When the measuring barrel 53 rotates, the brewing powders falling on the measuring barrel 53 are moved as well. When the brewing powder is moved to the boundary between the measuring barrel 53 and the neck space 512 of the intermediate barrel 51, only the brewing powder in the slot 531 can be moved with the rotating measuring barrel 53 while other brewing powder is blocked by the inside wall of the neck space and are kept in the intermediate barrel 51. Thus, counting the rotating angles or circles of the measuring barrel 53 easily calculates the amount of brewing powder falling into the partafilter 70. The unloading timer 642 transmits signals to the controller 61 to let the controller 61 know the operation time of the unloading motor 52. When a predetermined operation time of the unloading motor 52 is reached, the controller 61 send signals to the motor driving unit 62 to shut down the unloading motor 52. The user may set the predetermined operation time of the unloading motor 52 in the controller 61, or a control button is added to allow the user to change the predetermined operation time of the unloading motor 52 based on the desired amount of the brewing powder since different brewing liquids may need a different amount of the brewing powder. When the unloading motor 52 stops, the unloading indicator 652 is switched off (S4). Therefore, the user knows that the unloading process is finished and then can take out the partafilter 70 to use the brewing powder in the partafilter 70.

If the brewing powder in the intermediate barrel 51 are determined not to be adequate in step (S2), the inadequate powder indicator 653 is switched on and the sensing signal of the material sensor 631 is read (S5). Based on the sensing signal of the material sensor 631, the controller 61 determines if the holder 13 has adequate brewing materials (S6).

If the brewing materials are determined to be adequate in step (S6), the controller 61 transmits a signal to the motor driving unit 62 and then the motor driving unit 62 rotates the grinding motor 32 to grind the brewing materials until the brewing powder in the intermediate barrel 51 is determined to be adequate based on the signals sent by the powder sensor 632 (S7). Then the controller 61 executes the step (S3).

If the brewing materials are determined not to be adequate in step (S6), the controller 61 switches on the inadequate material indicator 651 and continually reads the signals from the material sensor 631. Then the user knows that the brewing materials are not adequate in the holder 13 and has to add brewing materials through the inlet 11 of the main casing 10. When the brewing materials in the holder 13 are determined to be adequate based on the signals from the material sensor 631, the controller 61 switches off the inadequate material indicator 651 (S8). The user needs to press the auxiliary button 66 to actuate the grinding motor 32 through the controller 61 and the motor driving unit 62. The controller 61 determines whether the auxiliary button 66 is pressed (S9). If the auxiliary button 66 is determined to be pressed, the controller 61 executes the step S7. If the auxiliary button 66 is determined not to be pressed, the controller 61 delays a predetermined time such as 0.5 seconds and then executes step S9 again.

The grinder has the following advantages. With the cooperation of the grinding assembly 30 and the unloading assembly 50, a user can grind tea leaves, Chinese herbal medicine materials, petals, adlay and so on that can be ground at once to provide fresh brewing powder for the user to brew the liquid tea, liquid medicine, herbal tea, a mixture and so on. Brewing the liquids with the fresh brewing powder keeps the nutrient content and flavor. In addition, bags for packaging the brewing powder are no longer needed to prevent environmental pollution. Moreover, the unloading assembly collects the ground brewing powder first, and then the brewing powder is unloaded as the user demands. Thus, the unloading assembly is easily used to control the unloading quantity of the brewing powder to prevent the brewing materials from dropping down for the grinding assembly to grind.

Figure 16:
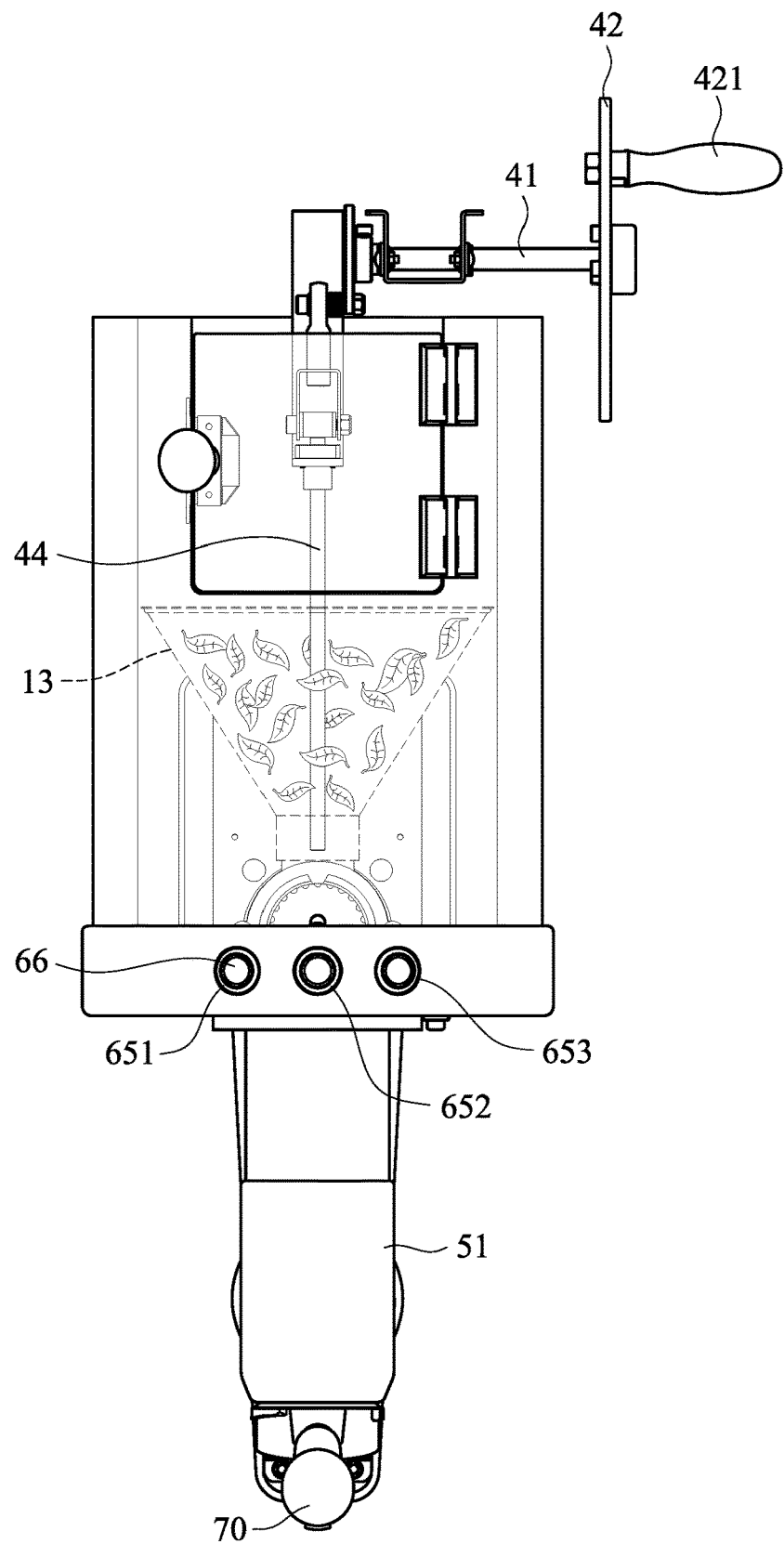
FIG. 16 is an enlarged operational front view of the grinder in FIG. 1.

Further, with reference to FIG. 16, the brewing materials may not smoothly drop into the grinding assembly 30 from the holder 13 since the second end opening of the holder 13 may be blocked by the brewing materials after a period of use. The user can rotate the driving wheel 42 of the auxiliary assembly 40 to rotate the shaft 41. Then the linkage 44 is moved up and down to agitate the brewing materials in the holder 13 so that the brewing materials blocking the second end opening of the holder 13 are removed.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A grinder for preparing brewing materials comprising:
    a main casing having
        a wall;
        an inlet formed through the wall;
        an outlet formed through the wall; and
        a holder mounted between the inlet and the outlet and having
            a first end opening communicating with the inlet; and
            a second end opening communicating with the outlet;
    a grinding assembly adapted for grinding brewing materials, mounted between the holder and the outlet of the main casing and having a grinding motor; and
    an unloading assembly mounted under the outlet of the main casing and having
        an intermediate barrel having
            a top open end of the intermediate barrel communicates with the outlet of the main casing; and
            a bottom open end;
        a measuring barrel mounted in the intermediate barrel; and
        an unloading motor driving the measuring barrel; and
    a control module electrically connecting to the grinding assembly and the unloading assembly to control the grinding motor and the unloading motor and having
        a controller;
        a motor driving unit electrically connecting to the controller, the grinding motor and the unloading motor;
        a material sensor electrically connecting to the controller and mounted in the main casing;
        a powder sensor electrically connecting to the controller and mounted in the intermediate barrel;
        a inadequate material indicator electrically connecting to the controller and mounted on the main casing;
        a unloading indicator electrically connecting to the controller and mounted on the main casing;
        a inadequate powder indicator electrically connecting to the controller and mounted on the main casing;
        an auxiliary button electrically connecting to the controller and
        a microswitch electrically connecting to the controller, wherein
    the controller executes following steps:
        a. determining if the microswitch is pressed down, if so, entering step b;
        b. reading sensing signals from the powder sensor and determine if brewing powder in the intermediate barrel is adequate based on the sensing signals from the powder sensor;
        c. if the brewing powder in the intermediate barrel is determined to be adequate in step b, switching on the unloading indicator and sending signals to the motor driving unit so that the motor driving unit actuates the unloading motor, and then switching off the unloading indicator and sending signals to the motor driving unit so that the motor driving unit switches off the unloading motor when finishing unloading;
        d. if the brewing powder in the intermediate barrel is determined not to be adequate in step b, reading sensing signals from the material sensor to determine if the brewing materials in the holder are adequate based on the sensing signals from the material sensor;
        e. if the brewing materials in the holder are determined to be adequate in step d, sending signals to the motor driving unit so that the motor driving unit actuates the grinding motor until the brewing powder in the intermediate barrel is determined to be adequate based on the sensing signals from the powder sensor, and then back to the step c;
        f. if the brewing materials in the holder are determined not to be adequate in step d, switching on the inadequate material indicator and continually reading the sensing signals from the material sensor until the brewing materials in the holder are determined to be adequate based on the sensing signals from the material sensor, and then go to a step g;
        g. determining if the auxiliary button is pressed;
        h. if the auxiliary button is pressed, back to the step e; and
        i. if the auxiliary button is not pressed, back to the step g.

2. The grinder as claimed in claim 1, wherein the intermediate barrel has
    an axis hole formed through the intermediate barrel; and a neck space formed in the intermediate barrel and having an inner diameter smaller than other part of the intermediate barrel the measuring barrel is mounted through the axis hole of the intermediate barrel, is mounted rotatably in the neck space of the intermediate barrel and has an outer diameter corresponding to the inner diameter of the neck space to allow the measuring barrel to rotate in the neck space but not to move transversely; and multiple slots formed longitudinally on an outside wall of the measuring barrel.

3. The grinder as claimed in claim 1, wherein the intermediate barrel has an axis hole formed through the intermediate barrel; and a neck space formed in the intermediate barrel and having an inner diameter smaller than other part of the intermediate barrel the measuring barrel is mounted through the axis hole of the intermediate barrel, is mounted rotatably in the neck space of the intermediate barrel and has an outer diameter corresponding to the inner diameter of the neck space to allow the measuring barrel to rotate in the neck space but not to move transversely; and multiple slots formed longitudinally on an outside wall of the measuring barrel; and the control module has a unloading timer electrically connecting to the controller, wherein when the controller executes the step c, the unloading timer transmits the signal to the controller to report an operation time of the unloading motor; and when the operation time of the unloading motor reaches a predetermined time set in the controller, the controller sends signals to the motor driving unit to shut down the unloading motor.

4. The grinder as claimed in claim 1, wherein the microswitch corresponds to the bottom opening of the intermediate barrel.

5. The grinder as claimed in claim 4, wherein the unloading assembly is mounted on a seat mounted securely on a bottom of the main casing and having a first frame having an arc notch; and two arc second frames mounted at an interval above the first frame; and the microswitch is mounted between the second frames.

6. The grinder as claimed in claim 1 further comprising an auxiliary assembly mounted in the main casing and having a shaft mounted pivotally through the main casing and having an outer end extending out of the main casing; and an inner end;

a driving wheel mounted securely on the outer end of the shaft;

a driven wheel mounted in the main casing and mounted securely on the inner end of the shaft; and a linkage connected to the driven wheel and having a top end attached to the driven wheel; and a bottom end extending into the holder.

7. The grinder as claimed in claim 6, wherein the auxiliary assembly has a first bracket mounted securely in the main casing and mounted rotatably around the shaft; and a second bracket mounted securely in the main casing and mounted slidably around the linkage.

8. The grinder as claimed in claim 6 further comprising a handle formed on the driving wheel.

9. The grinder as claimed in claim 7 further comprising a handle formed on the driving wheel.

10. The grinder as claimed in claim 1, wherein the main casing has a transparent outer casing;

an inner casing mounted in the outer casing at an interval to form a display space, wherein the inlet of the main casing is formed through the inner and outer casings and the holder is mounted in the inner casing;

a top panel covering on top ends of the outer casing and the inner casing;

a bottom panel covering on bottom ends of the outer casing and the inner casing, wherein the outlet of the main casing is formed through the bottom panel; and a partition formed in the display space and surrounding the inlet.

11. The grinder as claimed in claim 1, wherein the main casing has a door mounted pivotally on the outer casing and selectively closed to cover the inlet.

12. The grinder as claimed in claim 1 further comprising an additional casing mounted on a top of the main casing.

13. The grinder as claimed in claim 10 further comprising an additional casing mounted on a top of the main casing.

14. The grinder as claimed in claim 12, wherein the additional casing has a transparent outer casing;

an inner casing mounted in the outer casing of the additional casing at an interval to form a display space;

a top panel covering on top ends of the outer casing and the inner casing of the additional casing.

15. The grinder as claimed in claim 13, wherein the additional casing has a transparent outer casing;

an inner casing mounted in the outer casing of the additional casing at an interval to form a display space;

a top panel covering on top ends of the outer casing and the inner casing of the additional casing.

* * * * *